1,945,233

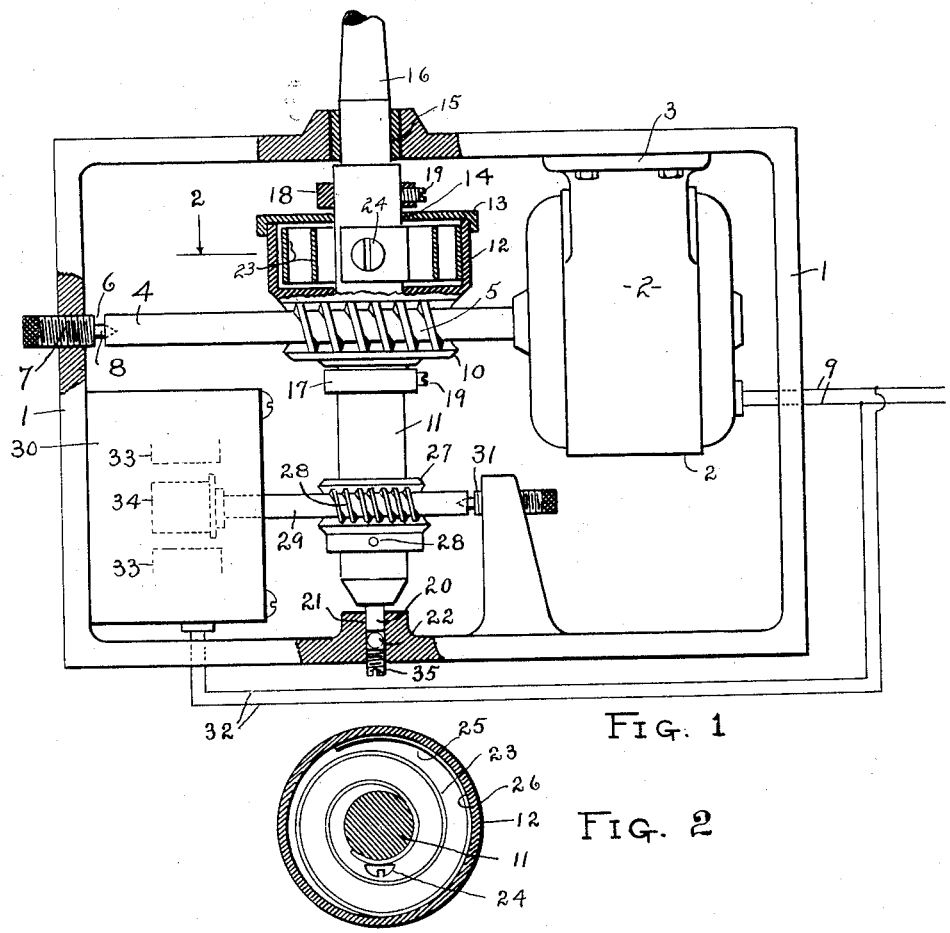
FIG. 1
FIG. 2
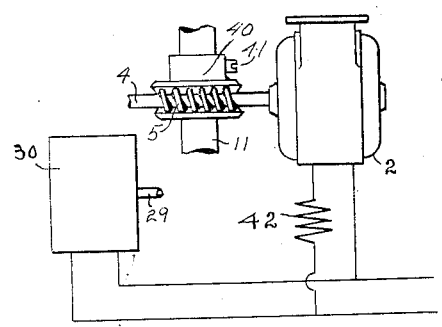
FIG. 3
Inventor
William C. Roe
By Slough and Canfield
Attorney Patented Jan. 30, 1934

UNITED STATES PATENT OFFICE 1,945,233

SPEED GOVERNING MECHANISM

William C. Roe, Elyria, Ohio, assignor to Telkor, Inc., Elyria, Ohio, a corporation of Ohio Application July 8, 1930. Serial No. 466,402

2 Claims. (Cl. 172—293)

This invention relates to speed governing or controlling apparatus and particularly to apparatus for supplying power at a constant rotary speed from a power source of varying rotary speed.

My invention is applicable to numerous uses, one of the more important of which is the driving of the turn-table of a phonograph and it is as applied to this use that I have chosen to describe my invention herein.

As is well known, a phonograph turn-table must be rotated at constant speed. Electric motors driven from the ordinary domestic alternating current circuit constitute an ideal source of power for the turn-table but are subject to speed variations due to the fluctuations of voltage of the supply circuit. These fluctuations may be very slight and occasioned merely by slight changes in the current load of the circuit but are nevertheless great enough to vary the motor speed and turn-table speed undesirably.

The frequency of the alternating current however is substantially constant over considerable periods of time and if it varies the variations thereof are not rapid.

It is therefore one of the objects of my invention to utilize the substantially constant frequency of the alternations of the supply circuit to regulate the speed of the phonograph turn-table when rotated by an electric motor operating at varying speed.

Another object is to provide an apparatus by which the power of an alternating current electric motor may be employed to drive the turn-table of a phonograph and in which the speed at which the turn-table is rotated may be maintained substantially constant in an improved manner regardless of fluctuations in the speed of the driving motor.

Another object is to provide an apparatus for utilizing the power of an alternating current electric motor connected to a supply circuit, the electric energy from which circuit fluctuates causing the speed of the motor to vary and in which apparatus a constant factor of the circuit may be employed to control the speed out-put from the motor to a substantially constant value.

Another object is to provide an apparatus for rotatably driving the turn-table of a phonograph or other power-receiving device comprising two motors one of which supplies the power and the other of which controls the rate of speed at which the power is delivered to the apparatus to be driven.

Another object is to provide an apparatus for supplying power to rotate a phonograph turn-table or other apparatus in which two motors are connected to the same power-supplying shaft, one of them supplying the power and the other controlling the speed of rotation of the shaft.

Another object is to provide an apparatus for supplying power to rotate a phonograph turn-table or other apparatus in which two motors connected to the same supply circuit are employed, one of them supplying the power and subject to variations of speed and the other rotating synchronously with the alternations of the supply circuit and controlling the speed at which the power is delivered by the first motor.

Other objects of my invention will be apparent to those skilled in the art to which my invention appertains.

My invention is fully disclosed in the following description taken in connection with the accompanying drawing, in which:

Fig. 1 is an elevational cross-sectional view illustrating in simplified form an embodiment of my invention;

Fig. 2 is a cross-sectional view taken from the plane 2 of Fig. 1;

Fig. 3 is a diagrammatic view illustrating a modification of my invention.

Referring to the drawing, I have shown at 1 a main supporting frame, at 2 an alternating current electric motor rigidly secured by its base 3 upon the frame 1. The motor shaft 4 is extended beyond the usual length and has thereon a worm 5, and the outer end of the shaft 4 is supported on a thrust bearing 6. The bearing 6 may be of any suitable construction but, as illustrated, comprises a screw 7 threaded into the main frame 1 and provided with a pivot bearing point 8 disposed in a suitable corresponding recess in the end of the shaft 4. The screw 7 may be turned to longitudinally adjust the position of the worm 5.

The motor 2 is preferably of the conventional single phase alternating current type adapted to be energized to rotate the shaft 4 by current conducted thereto through wires 9 from a suitable supply source.

Meshed with the worm 5 is a worm wheel 10 rotatably mounted upon a shaft 11 disposed at right angles to the shaft 4 and laterally thereof. The worm wheel is formed, preferably integrally with a clutch housing 12 comprising a circular cup coaxial with the shaft 11. A cover 13 fits the open end of the cup 12. The shaft 11 extends through the worm wheel 10 and axially through the housing 12 and through a suitable perforation 14 in the cover 13, and extends upwardly through the frame 1, being rotatably mounted in the frame in a sleeve bearing 15 thereon and terminates upwardly as at 16 in a tapered portion adapted to support the turn-table of a phonograph in a well known manner.

The axial position on the shaft 11 of the worm wheel 10 and housing 12 is determined by a collar 17 and a collar 18 on the shaft disposed respectively below the worm wheel 10 and beyond the cover 13 and secured on the shaft by set screws 19—19.

The shaft 11 is supported by an anti-friction bearing at its lower end comprising a stem 20 of reduced diameter guided in a cylindrical recess 21 in the frame 1 and resting upon a ball 22 at the bottom of the recess. The bottom of the recess may comprise the end of a screw 35 by which the shaft 11 may be axially adjusted.

Within the housing 12 is a spirally wound flat spring 23 the inner end of which is secured to the shaft 11 as by a screw 24. The outer end portion 25 of the spring 23 frictionally engages, by the flat external surface thereof, the inner surface 26 of the cup-shaped housing 12.

By this construction it will be apparent that upon energizing the motor 2 to turn the worm 5, the worm wheel 10 will be turned, turning the housing 12 with it. The frictional engagement of the housing with the spring 23 will wind up the same around the shaft 11 until a certain degree of tension in the spring has been attained. Further rotation of the housing 12 will cause it to slip with respect to the spring 23. Thus the torque applied to turn the shaft 12 is derived from the frictional engagement between the housing 12 and spring 23.

Spaced from the worm wheel 10 is a second worm wheel 27 rigidly connected to the shaft 11 as by a pin 28. Meshed with the worm wheel 27 is a worm 28 mounted on a shaft 29 which is an extension of the shaft of a synchronous motor indicated generally at 30. The outer end of the shaft 29 is supported in a thrust bearing 31 which may be similar to the bearing 6 above described.

The synchronous motor 30 is adapted to be energized by current through wires 32 from the same source of supply as the motor 2 is energized. The motor 30 may be of any known or suitable construction but I prefer to employ one of the well known small synchronous motors comprising an unwound rotor revolving between the poles of a single phase alternating current field magnet. In the drawing I have indicated the field poles at 33—33 and the rotor at 34 connected to the shaft 29. As is well known, in motors of this type, the rotor 34 will rotate the shaft 29 synchronously with the alternations of the supply circuit and therefore at a constant speed varying only with variations of the frequency, and such frequency variations being so slight as to be negligible, the shaft 29 will be rotated substantially at a constant speed.

To properly mesh the worms and worm wheels, the shaft 29 may be adjusted axially by the bearing 31 and the shaft 11 adjusted axially by the screw 35 to fit the worm 28 with its worm wheel 27. Similarly the shaft 4 may be adjusted axially by the bearing 6 and the worm wheel 10 may be adjusted axially on the shaft 11 by the collar 17 and collar 18.

In the operation of my invention, the motor 2 when energized winds up the spring 23 and applies torque through the spring to tend to turn the shaft 11. If at this time the motor 30 be considered as not energized, the shaft 11 will not be able to turn because of the locking engagement of the worm wheel 27 with the worm 28, such worm wheel and worm combination being non-reversible as is well known, the worm 28 being able to drive the worm wheel 27 but not vice versa if the helical angle of lead of the worm 28 is sufficiently small and in this instance, it is intentionally chosen sufficiently small. However if the motor 30 be energized, the worm 28 will turn at a constant rate and permit the shaft 11 to be turned by the said torque tending to turn it, and inasmuch as the worm wheel 27 on the shaft 11 cannot react to apply torque to the shaft 29, either to speed it up or to slow it down, the shaft 11 must rotate at a constant speed.

If the speed of the motor 2 should fluctuate, due for example to fluctuations of supply voltage, it may speed up, in which case the housing 12 will slip on the spring 23 but continue to apply torque to the shaft 11. If the motor 2 on the other hand should slow down, slippage between the housing 12 and spring 23 may cease and torque continue to be transmitted through the spring 23. The power capacity of the motor 2 and its normal speed is chosen so that the shaft 11 and worm 27 will always overhaul the worm 28. Thus at all speeds of the motor 2, the shaft 11 will be rotated at a uniform velocity.

Thus the electric energy in the supply circuit is employed for two purposes, one to supply power through the motor 2 and the other to effect a regulation in accordance with the frequency of the supply by the motor 30 to regulate the speed at which the motor 2 supplies its power.

In Fig. 3 I have shown a modification of my invention in which the slipping clutch comprising the housing 12 and spring 23 are omitted and the worm wheel 40 is secured directly to the shaft 11 as by set screw 41. In this form of my invention, a resistance 42 is placed in series with the motor 2.

The operation of this form of my invention is generally the same as that in Figs. 1 and 2. The power from the motor 2 overhauls the motor 30 as before, the motor 30 preventing rotation of the shaft 11 beyond a speed determined by the frequency of the supply. In this form, if the motor 2 tends to speed up, due to an increase of voltage and current, the voltage drop through the resistance 42 increases and thus limits the increase of voltage on the motor 2 to a relatively small value. If the motor 2 tends to slow down due to a reduction of line voltage and current, the voltage drop across the resistance 42 diminishes and again tends to compensate for the change in voltage causing the resultant fluctuation of voltage on the motors to itself to be relatively small.

Thus the changes in speed of the motor 2 resulting from voltage fluctuations of the line are minimized.

It will be understood that my invention is fully operative without the slipping clutch 12—23 or the resistance 42 and correspondingly with the worm wheel 10 rigidly secured directly to the shaft 11, and with such an arrangement the synchronous motor 30 will constrain the shaft 11 to rotate at a uniform velocity at varying torques and power inputs of the motor 2 within a wide range of variations. By employing either the clutch 12—23 or the resistance 42, the permissible range of variations of power and speed of the motor 2 is greatly increased without danger that the worm wheel 27 may overhaul the worm 28 powerfully enough to act as a brake and stop the relatively weak motor 30.

Having thus described my invention, I am aware that numerous and extensive departures may be made therefrom, but without departing from the spirit of my invention.

I claim:

1. In a power supplying mechanism, a rotary power source, a rotary power-delivering element, rotatable by the power source at torque below a predetermined value only, a worm wheel on the power-delivering element, a second rotary element, a worm thereon meshed with the said worm wheel whereby the two rotary elements are constrained to rotate at a fixed velocity ratio and whereby the power-delivering element is prevented from rotating except upon rotation of the second rotary element, and means for rotating the second rotary element at substantially constant speed to cause the power-delivering element to rotate at substantially a constant speed.

2. In a power supplying mechanism, an asynchronous electric motor connected to a source of alternating current supply, a rotary shaft adapted to be rotated by the motor, a transmitting mechanism between the motor and the shaft preventing transmission of torque above a predetermined value, a synchronous motor connected to the same source of supply, a worm connected to the synchronous motor rotor, a worm wheel meshed with the worm and on the rotary shaft whereby the shaft and rotor are constrained to rotate at a fixed velocity ratio and the shaft is prevented from rotation except upon rotation of the said rotor and whereby upon rotation of the rotor at substantially a constant speed in response to the substantially constant frequency of alternations of the said circuit, the shaft is caused to rotate at substantially a constant speed.

WILLIAM C. ROE.